(12) United States Patent
Honma et al.

(10) Patent No.: US 6,680,138 B1
(45) Date of Patent: Jan. 20, 2004

(54) PROTON-CONDUCTING MEMBRANE, METHOD FOR PRODUCING THE SAME, AND FUEL CELL USING THE SAME

(75) Inventors: Itaru Honma, Tsukuba (JP); Shigeki Nomura, Tsukuba (JP); Toshiya Sugimoto, Tsukuba (JP); Osamu Nishikawa, Tsukuba (JP)

(73) Assignees: Electrotechnical Laboratory (Agency of Industrial Science and Technology), Tsukuba (JP); Sekisui Chemical Co., Ltd., Tsukuba (JP)

( * ) Notice: Subject to any disclaimer, the term of this patent is extended or adjusted under 35 U.S.C. 154(b) by 451 days.

(21) Appl. No.: 09/662,909

(22) Filed: Sep. 15, 2000

(51) Int. Cl.$^7$ .......................... H01M 9/86; H01M 4/90; H01M 4/96
(52) U.S. Cl. .................. 429/33; 429/42; 429/44
(58) Field of Search ........................ 429/34, 30, 33, 429/41, 44

(56) References Cited

U.S. PATENT DOCUMENTS

| | | | | |
|---|---|---|---|---|
| 4,127,706 A | * | 11/1978 | Martin et al. | 429/122 |
| 4,330,654 A | | 5/1982 | Ezzell et al. | 526/243 |
| 4,594,297 A | * | 6/1986 | Polak et al. | 429/13 |
| 4,950,314 A | | 8/1990 | Yamada et al. | 55/158 |
| 5,911,860 A | * | 6/1999 | Chen et al. | 204/295 |
| 6,242,135 B1 | * | 6/2001 | Mushiake | 429/304 |

FOREIGN PATENT DOCUMENTS

| | | |
|---|---|---|
| EP | 1085038 A1 | 3/2001 |
| JP | 04-366137 | 12/1992 |
| JP | 06-342665 | 12/1994 |
| JP | 08-020704 | 1/1996 |
| JP | 08-249923 | 9/1996 |
| JP | 09-087510 | 3/1997 |
| JP | 09-110982 | 4/1997 |
| JP | 10-021943 | 1/1998 |
| JP | 10-045913 | 2/1998 |
| JP | 10-069817 | 3/1998 |

OTHER PUBLICATIONS

Depre, L., et al. "Inorganic–organic proton conductors based on alkysulfone functionalities and their patterning by photoinduced methods" Electrochimica Acta. vol. 43 Nos. 10–11, pp.1301–1306, 1998.
Tatsumisago, M., et al. "Proton–conducting silica–gel films doped with a variety of electrolytes" Elsevier Science B.V. Solid State Ionics 74 (1994) pp 105–108.

* cited by examiner

Primary Examiner—Patrick Ryan
Assistant Examiner—Julian Mercado
(74) Attorney, Agent, or Firm—Armstrong, Kratz, Quintos, Hanson & Brooks, LLP

(57) ABSTRACT

It is an object of the present invention to provide a proton-conducting membrane excellent in resistance to heat and durability and showing excellent proton conductivity at high temperature. It is another object of the present invention to provide a method for producing the same and fuel cell using the same.

The present invention provides a proton-conducting membrane, comprising an organic material (A), three-dimensionally crosslinked structure (B) containing a specific metal-oxygen bond, agent (C) for imparting proton conductivity, and water (D), wherein the organic material (A) has a number-average molecular weight of 56 to 30,000, and at least 4 carbon atoms connected in series in the main chain, and the organic material (A) and three-dimensionally crosslinked structure (B) are bound to each other via a covalent bond.

22 Claims, 1 Drawing Sheet

PROTON-CONDUCTING MEMBRANE, METHOD FOR PRODUCING THE SAME, AND FUEL CELL USING THE SAME

BACKGROUND OF THE INVENTION

This invention relates to a proton-conducting membrane, method for producing the same, and fuel cell using the same, more particularly the proton-conducting membrane, excellent in resistance to heat and durability and showing excellent proton conductivity at high temperature, method for producing the same, and fuel cell using the same.

Recently, fuel cell has been attracting attention as a power generating device of the next generation, which can contribute to solution of the problems related to environments and energy, now having been increasingly becoming serious social problems, because of its high power generation efficiency and compatibility with the environments.

Fuel cells fall into several categories by electrolyte type. Of these, a polymer electrolyte fuel cell (PEFC), being more compact and generating higher output than any other type, is considered to be a leading fuel cell type in the future for various purposes, e.g., small-size on-site facilities, and as movable (i.e., power source of vehicles) and portable cells.

However, PEFCs are still in the development or testing stages and not yet commercialized so far, in spite of their inherent advantages in principle, because of lack of the practical electrolytic membrane which satisfies all of the requirements, e.g., resistance to heat, durability and proton conductivity. The electrolytic membranes for the current PEFCs are mainly of fluorine-based ones, with a perfluoroalkylene as the main skeleton, and partly with ion-exchangeable groups, e.g., sulfonic and carboxylic acid groups, at the terminal of the perfluorovinyl ether side chains. Several types of these fluorine-based membranes have been proposed, e.g., Nafion membrane (Du Pont, U.S. Pat. No. 4,330,654), Dow membrane (Dow Chemical, Japanese Patent Application Laid-Open No.4-366137), Aciplex membrane (Asahi Chemical Industry, Japanese Patent Application Laid-Open No.6-342665), and Flemion membrane (Asahi Glass).

The current PEFCs using the above fluorine-based membranes as the electrolyte are normally operated in a relatively low temperature range, e.g., room temperature to around 80° C., because the fluorine-based membrane itself has a glass transition temperature (Tg) of around 130° C., above which its ion channel structure responsible for the ion conductivity will be destroyed. It is not desirable for a fuel cell to operate in a low temperature range, because of some serious problems, e.g., low power generation efficiency and notable poisoning of the catalyst with carbon monoxide.

Fuel cells have been continuously developed to operate in a higher temperature range, in order to avoid the problems resulting from operation in a low temperature range. Operability at higher temperature brings about several advantages. For example, when operated at 100° C. or higher, power generation efficiency should increase and, at the same time, heat can be utilized to improve energy efficiency. When operating temperature can be increased to 140° C., still other advantages, in addition to the above, can be expected, e.g., increased choices for the catalyst material, thus helping reduce fuel cell cost.

A variety of electrolyte membranes (e.g., proton-conducting membranes) have been proposed so far to increase operating temperature of PEFCs.

Some of more representative ones are heat-resistant aromatic-based polymers to replace the conventional fluorine-based membranes. These include polybenzimidazole (Japanese Patent Application Laid-Open No.9-110982), polyether sulfone (Japanese Patent Application Laid-Open Nos.10-21943 and 10-45913), and polyetheretherketone (Japanese Patent Application Laid-Open No.9-87510). However, each of these aromatic-based polymers is highly rigid, possibly causing damages while the membrane-electrode assembly (MEA) is formed.

They have other types of disadvantages. For example, they are modified with an acidic group (e.g., sulfonic or phosphoric acid group) to have proton conductivity necessary for the electrolytic membrane, with the result that they are water-soluble or swelling in the presence of water. The water-soluble ones are not applicable to fuel cells, because water is produced therein. On the other hand, those swelling in the presence of water may cause problems, because the swelling can generate a sufficient stress in the membrane to damage the electrode, or deteriorate membrane strength leading to its destruction.

On the other hand, the following inorganic materials have been proposed as the proton-conducting materials. For example, Minami et al. incorporate a variety of acids in hydrolysable silyl compounds to prepare inorganic proton-conducting materials (Solid State Ionics, 74 (1994), pp.105). They stably show proton conductivity at high temperature, but involve several problems; e.g., they tend to be cracked when made into a thin film, and difficult to handle and make them into MEAs. Several methods have been proposed to overcome these problems. For example, the proton-conducting material is crushed to be mixed with an elastomer (Japanese Patent Application Laid-Open No.8-249923) or with a polymer containing sulfone group (Japanese Patent Application Laid-Open No.10-69817). However, these methods have their own problems. For example, the polymer as the binder for each of these methods has no bond or the like with an inorganic crosslinked compound and has basic thermal properties not much different from those of the polymer itself, with the result that it undergoes structural changes in a high temperature range, failing to stably exhibit proton conductivity.

A number of R & D efforts have been made for various electrolyte membranes to solve these problems involved in the conventional PEFCs. None of them, however, have succeeded in developing proton-conducting membranes showing sufficient durability at high temperature (e.g., 100° C. or higher) and satisfying the mechanical requirements.

SUMMARY OF THE INVENTION

It is an object of the present invention to provide a proton-conducting membrane excellent in resistance to heat and durability and showing excellent proton conductivity at high temperature, which can solve the problems involved in the conventional PEFCs, and a method for producing the same and fuel cell using the same.

The inventors of the present invention have found, after having extensively studied a variety of electrolyte membranes to solve the above problems, that an innovative organic/inorganic composite membrane can be obtained by including, as the essential components, a selected combination of specific organic material, three-dimensionally cross-liiked structure containing a specific metal-oxygen bond, agent for imparting proton conductivity and specific proton-conducting material, reaching the present invention. It shows much higher resistance to heat and durability, and proton conductivity at high temperature than the conventional one, because of the covalent bond formed between the organic material and three-dimensionally crosslinked structure to disperse them very finely at the molecular level (nano-dispersion).

The first invention is a proton-conducting membrane, comprising (A) an organic material, (B) a three-dimensionally crosslinked structure containing a specific metal-oxygen bond, (C) an agent for imparting proton conductivity, and (D) water, wherein
- (i) the organic material (A) has a number-average molecular weight of 56 to 30,000, and at least 4 carbon atoms connected in series in the main chain, and
- (ii) the organic material (A) and three-dimensionally crosslinked structure (B) are bound to each other via a covalent bond.

The second invention is the proton-conducting membrane of the first invention, wherein the organic material (A) is a polyether.

The third invention is the proton-conducting membrane of the second invention, wherein the organic material (A) is a polytetramethylene oxide.

The fourth invention is the proton-conducting membrane of the first invention, wherein the organic material (A) is a polymethylene.

The fifth invention is the proton-conducting membrane of the fourth invention, wherein the organic material (A) is octamethylene.

The sixth invention is the proton-conducting membrane of the first invention, wherein the organic material (A) contains a water-retentive resin (E) having less than 4 carbon atoms connected in series in the chain.

The seventh invention is the proton-conducting membrane of the sixth invention, wherein the water-retentive resin (E) is a polyethylene oxide.

The eighth invention is the proton-conducting membrane of the first invention, wherein the organic material (A) is a mixture of polytetramethylene oxide and polyethylene oxide.

The ninth invention is the proton-conducting membrane of the first invention, wherein the three-dimensionally crosslinked structure (B) is formed by a silicon-oxygen bond.

The tenth invention is the proton-conducting membrane of the first invention, wherein the agent (C) for imparting proton conductivity is an inorganic solid acid.

The $11^{th}$ invention is the proton-conducting membrane of the tenth invention, wherein the inorganic solid acid is tungstophosphoric acid. The $12^{th}$ invention is the proton-conducting membrane of the first invention, which contains 5 to 500 wt. parts of the agent (C) for imparting proton conductivity per 100 wt. parts of the organic material (A) and three-dimensionally crosslinked structure (B) totaled.

The $13^{th}$ invention is the proton-conducting membrane of the first invention, which contains water (D) at 1 to 60 wt. %, based on the whole proton-conducting membrane.

The $14^{th}$ invention is the proton-conducting membrane of the first invention, which further contains a reinforcing agent (F).

The $15^{th}$ invention is the proton-conducting membrane of the $14^{th}$ invention, wherein the reinforcing agent (F) is glass fibers.

The $16^{th}$ invention is a method for producing a proton-conducting membrane, comprising steps of preparing a reaction system containing a mixture of an organic material (A), hydrolyzable inorganic compound which forms a three-dimensionally crosslinked structure (B) and agent (C) for imparting proton conductivity; forming the reaction system into a film; and sol-gel reaction of the film in the presence of water vapor or liquid water (D), to form the three-dimensionally crosslinked structure (B) by the metal-oxygen bond in the film. The $17^{th}$ invention is a method for producing a proton-conducting membrane, comprising steps of preparing a reaction system containing a mixture of an organic material (A), hydrolyzable inorganic compound which forms a three-dimensionally crosslinked structure (B) and agent (C) for imparting proton conductivity; forming the reaction system into a film; and sol-gel reaction of the film in the presence of water vapor or liquid water (D) and vapor or liquid of an alcohol having a carbon number of 4 or less, to form the three-dimensionally crosslinked structure (B) by the metal-oxygen bond in the film.

The $18^{th}$ invention is the method for producing a proton-conducting membrane of the $16^{th}$ or $17^{th}$ invention, wherein the organic material (A) and hydrolyzable inorganic compound which forms the three-dimensionally crosslinked structure (B) are mixed with each other in an organic solvent (G).

The $19^{th}$ invention is the method for producing a proton-conducting membrane of the $18^{th}$ invention, wherein the organic solvent (G) is further incorporated with a compound (H) having a relative dielectric constant of 20 or more and boiling point of 100° C. or higher.

The $20^{th}$ invention is the method for producing a proton-conducting membrane of the $19^{th}$ invention, wherein the compound (H) having a relative dielectric constant of 20 or more and boiling point of 100° C. or higher is selected from the group consisting of ethylene carbonate, propylene carbonate and butylene carbonate.

The $21^{st}$ invention is a fuel cell which uses the proton-conducting membrane of one of the first to $15^{th}$ inventions.

BRIEF DESCRIPTION OF DRAWING

FIG. 1 shows output power performance of the fuel cell which uses the proton-conducting membrane of the present invention, determined by an electrochemical impedance meter.

PREFERRED EMBODIMENTS OF THE INVENTION

1. Organic Material (A)

Figure 1:
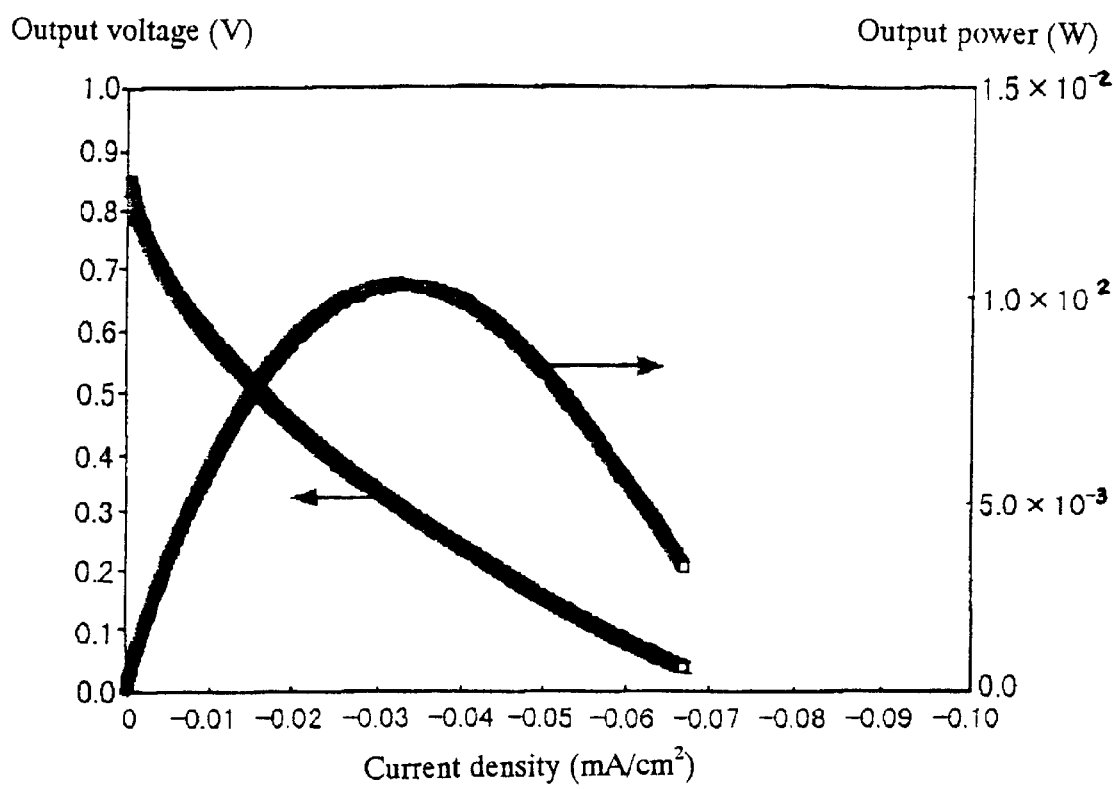
FIG. 1

The proton-conducting membrane of the present invention contains an organic material (A), three-dimensionally crosslinked structure (B) containing a specific metal-oxygen bond, agent (C) for imparting proton conductivity, and water (D).

The organic material (A) is used for the present invention to impart adequate softness to the proton-conducting membrane, and improve its handiness and facilitate fabrication of the MEAs. It is important for this organic material (A) to simultaneously satisfy the two requirements, to have a number-average molecular weight of 56 to 30,000, and at least 4 carbon atoms connected in series in the main chain.

The organic material (A) is not limited, so long as it satisfies the above two requirements. It is preferable that its structure is not destructed by an acid, in consideration that the agent (C) for imparting proton conductivity simultaneously used for the present invention is an acidic component.

An organic material which fails to satisfy the requirement of having at least 4 carbon atoms connected in series in the main chain is not desired, because it may not form a membrane of sufficient softness. An organic material having a hetero atom, e.g., oxygen, nitrogen or sulfur, in its structure may give a membrane of sufficient softness, even when it fails to have at least 4 carbon atoms connected in series in the main chain. Nevertheless, it is still undesirable, because of polarity interchange tending to occur in the chain comprising 3 or less carbon atoms, to make the membrane highly amenable to hydrolysis by the proton and water present therein. An organic material having at least 4 carbon atoms connected in series in the main chain can greatly control the polarity interchange, even when it has a hetero atom, e.g., oxygen, nitrogen or sulfur, in its structure, and hence is useful for the present invention.

The organic material (A) is not structurally limited, so long as it has at least 4 carbon atoms connected in series in the main chain. It may be of straight-chain or branched, or have a hetero atom, e.g., oxygen, nitrogen or sulfur, in its structure.

The structurally simplest organic material having 4 carbon atoms connected in series and useful for the present invention is butylene, whose molecular weight is 56. Number of carbons in the main chain is not limited. However, the organic material preferably has a number-average molecular weight of 30,000 or less, to realize the effect of heat resistance brought by binding the organic material (A) and three-dimensionally crosslinked structure (B) to each other.

The compounds useful for the present invention as the organic material (A) include, but not limited to, polyethers, e.g., polytetramethylene oxide and polyhexamethylene oxide; polyacrylic and polymethacrylic acids (hereinafter referred to as generic term of poly(meth)acrylic acid), e.g., n-propyl poly(meth)acrylate, isopropyl poly(meth)acrylate, n-butyl poly(meth)acrylate, isobutyl poly(meth)acrylate, sec-butyl poly(meth)acrylate, tert-butyl poly(meth)acrylate, n-hexyl poly(meth)acrylate, cyclohexyl poly(meth)acrylate, n-octyl poly(meth)acrylate, isooctyl poly(meth)acrylate, 2-ethylhexyl poly(meth)acrylate, decyl poly(meth)acrylate, lauryl poly(meth)acrylate, isononyl poly(meth)acrylate, isoboronyl poly(meth)acrylate, benzyl poly(meth)acrylate and stearyl poly(meth)acrylate; acrylamides, e.g., polyacrylamide, polyN-alkyl acrylamide, and poly2-acrylamide-2-methylpropane sulfonic acid; vinyl esters, e.g., polyvinyl acetate, polyvinyl formate, polyvinyl propionate, polyvinyl butyrate, polyvinyl n-caprorate, polyvinyl isocaprorate, polyvinyl octoate, polyvinyl laurate, polyvinyl palmitate, polyvinyl stearate, polyvinyl trimethylacetate, polyvinyl chloroacetate, polyvinyl trichloroacetate, polyvinyl trifluoroacetate, polyvinyl benzoate and polyvinyl pivalate; polyvinyl alcohol; acetal resin, e.g., polyvinyl butyral; polymethylenes, e.g., tetramethylene, hexamethylene, octamethylene, decamethylene, dodecamethylene and tetradecamethylene; polyolefins, e.g., long-chain polyethylene, polypropylene and polyisobutylene; and fluorine resins, e.g., polytetrafluoroethylene, polyvinylidene fluoride. Their copolymers and mixtures of two or more of the above organic polymers can be used for the present invention. Of these organic materials, polyethers, polyolefins and fluorine resins are preferable, for their resistance to acid and heat. Polyethers, e.g., polytetramethylene oxide and polyhexamethylene oxide, are more preferable, in consideration of imparting softness to the membrane, and compatibility with the three-dimensionally crosslinked structure and agent for imparting proton conductivity. Polyethers have adequate softness, and are well compatible with the three-dimensionally crosslinked structure and agent for imparting proton conductivity by the polarity of their ether bond. As a result, they allow larger quantities of the agent for imparting proton conductivity to be added, and are very advantageous for attaining high proton conductivity.

Polytetramethylene oxide is still more preferable, in consideration of its heat resistance, in addition to the above favorable characteristics. Polytetramethylene oxide of controlled molecular weight can be commercially available easily at moderate cost. It can be suitable used for the proton-conducting membrane of the present invention, because it imparts sufficient softness to the membrane, and is resistant to heat not to be colored or cut at up to 160° C.

Polytetramethylene oxide is not limited with respect to molecular weight, but the one having a weight-average molecular weight of 200 to 2000 is suitably used.

The polymethylene chains having no ether bond, or the so-called olefin chains, are also suitably used for the present invention, in consideration of their resistance to heat and acid. These include tetramethylene, hexamethylene, octamethylene, decamethylene, dodecamethylene, tetradecamethylene, long-chain polyethylene, branched isobutylene, isoprenes, and mixtures thereof. Of these, those with methylene chains having a carbon number of 4 to 20 are suitably used, because of their specially high conductivity.

The organic material for the present invention may be incorporated with a polar group, e.g., carboxylic, hydroxyl, sulfonic or phosphoric group, to improve its compatibility with the ion-conducting medium and inorganic crosslinked compound. It is preferable for the polyolefin and fluorine resin to have the polar group by copolymerization or the like.

The organic material (A) may be mixed with a water-retentive resin (E) having less than 4 carbon atoms connected in series in the chain, e.g., polyethylene oxide or polypropylene oxide, in addition to the above organic polymer, so long as its resistance to heat is not damaged. The water-retentive resin is defined as the resin which can contain water at 5 wt. % or more. It is especially preferable that it is soluble in water, although not limited with respect to its molecular weight. Such a water-retentive resin (E) functions to hold water (D) as the proton-conducting material, thus contributing to stable proton-conducting characteristic exhibited in a wide temperature range from low temperature.

Content of the water-retentive resin (E) is normally 5 to 95 wt. parts per 100 wt. parts of the organic material (A), preferably 10 to 80 wt. parts, although varying depending on, e.g., its thermal stability and resistance to acid. It may not impart sufficient water retentivity to the membrane when present at below 5 wt. parts, and may deteriorate heat resistance of the membrane at above 95 wt. parts.

One of the preferred embodiments of the organic material (A) is a combination of polytetramethylene oxide and polyethylene oxide. In such a case, it is preferable that polytetramethylene oxide has a weight-average molecular weight of approximately 200 to 2000 and polyethylene oxide has a weight-average molecular weight of approximately 100 to 1000. The ratio can be optionally selected not to damage heat resistance of the membrane.

It is necessary for the present invention that the organic material (A) and three-dimensionally crosslinked structure (B), having a metal-oxygen bond, are bound to each other via a covalent bond, as discussed later. The covalent bond can be introduced by one of the following two methods:

1) a substituent which can bind itself to the three-dimensionally crosslinked structure (B), e.g., a hydrolyzable silyl group or metal alkoxide, is introduced into the organic material (A) beforehand, and used to produce the covalent bond, and 2) a substituent which can react with the organic material (A), e.g., isocyanate, vinyl, amino, hydroxyl, carboxylic or epoxy group, is introduced into the three-dimensionally crosslinked structure (B) beforehand, and is reacted with the organic material (A) to produce the covalent bond.

Of the above two methods, the former is more preferable, because the components (A) and (B) can be more easily dispersed very finely at the molecular level (nano-dispersion), and it can be used simply. It is preferable, in this case, that the organic material (A) is incorporated with a hydrolyzable silyl group.

The hydrolyzable silyl group is the one reacting with water to form silanol (Si-OH), and includes silicon to which, e.g., one or more alkoxy groups (e.g., methoxy, ethoxy, n-propoxy, isopropoxy or n-butoxy group) or chlorine are bound.

The examples of the organic material (A) incorporated with a hydrolyzable silyl group include bis(triethoxysilyl) butane, bis(triethoxysilyl)hexane, bis(triethoxysilyl)octane, bis(triethoxysilyl)nonane, bis(triethoxysilyl)decane, bis(triethoxysilyl)dodecane, bis(triethoxysilyl)tetradodecane, a compound shown by the general formula $R^1_{3-x}R^2_x$—Si—$(CH_2)n$—Si—$R^1_{3-x}R^2_x$ [$R^1$ is hydroxy, methoxy, ethoxy, isopropoxy, n-propoxy, n-butoxy, isobutoxy, t-butoxy group, or chlorine; $R^2$ is methyl, ethyl, n-propyl or isopropyl group; (x) is an integer of 0 to 2; and (n) is an integer of 4 to 20], polypropylene oxide with a hydrolyzable silyl group at the terminal (KANEKA CORPORATION, SILYL™), polyisobutylene with a hydrolyzable silyl group at the terminal and/or side chain (KANEKA CORPORATION, EPION™), polyacrylate with a hydrolyzable silyl group at the terminal and/or side chain (KANEKA CORPORATION, GEMLAC™), and poly(ethylene-co-alkoxyvinylsilane) (Aldrich), which are commercially available.

An organic material can be easily incorporated with a hydrolyzable silyl group, by reacting it with commercially available 3-triethoxysilylpropyl isocyanate (Shin-Etsu Silicone, KBE9007) when it has hydroxyl or amino group, and by reacting it with 3-triethoxysilylpropylamine or the like when it has a halogen. It can be also easily incorporated with a hydrolyzable silyl group by reacting it with a silyl hydride, e.g., trialkoxysilane or dialkoxymonoalkylsilane, in the presence of a catalyst, e.g., chloroplatinic acid (the so-called hydrosililation reaction) when it has an unsaturated bond. When an organic material is a polymer, the organic polymer with a hydrolyzable silyl group at the terminal and/or side chain can be easily produced by copolymerizing a hydrolyzable silyl compound having a functional group (e.g., polymerizable unsaturated bond) with the monomer for the organic polymer.

Most of the above organic materials have two or more hydrolyzable silyl groups. Those having two or more hydrolyzable silyl groups are desirable, because they give the tenacious membranes. However, those having one hydrolyzable silyl group may be also useful for the present invention, so long as the membranes they give are sufficiently strong.

The organic material having one hydrolyzable silyl group preferably has at least one acid group (e.g., sulfonic or phosphoric group), hydroxyl group, hydrophilic group (e.g., weakly basic salt such as ammonium salt). The above hydrophilic group works to improve water retentivity of the membrane and accelerate proton conductivity. Generally speaking, the organic material having one hydrolyzable silyl group preferably has a molecular weight of 1000 or less, although not limited with respect to number of carbon atoms and molecular weight. The one having a molecular weight above 1000 may deteriorate strength or heat resistance of the membrane. Content of such an organic material is not limited so long as the membrane has a sufficient strength and heat resistance, but is 80 wt. % or less based on the total solids of the membrane, preferably 60 wt. % or less.

The organic material, when incorporated with a hydrolyzable silyl group, may not be necessarily further incorporated with a precursor for the three-dimensionally crosslinked structure (B), because the silyl group itself can produce such a structure by hydrolysis or the like. Nevertheless, however, it may be still incorporated with such a precursor.

Thus, the organic material, when incorporated with a hydrolyzable silyl group, is bound to the three-dimensionally crosslinked structure via the covalent bond, and can give the so-called inorganic/organic composite membrane in which they are composited at the molecular level via the metal-oxygen bond. Such a membrane is very suitable as the proton-conducting membrane serviceable at high temperature, because thermal stability inherent in the three-dimensionally crosslinked structure is further improved. Moreover, the crosslinked organic material makes the membrane more stable at high temperature, at which otherwise it would be dissolved or undergo structural changes.

The proton-conducting membrane of the present invention has sufficient resistance to heat and, at the same time, adequate softness for good handiness and easiness of making the MEAs, which come from the three-dimensionally crosslinked structure (B) as the heat-resistant component and organic material (A) as the softness component, are combined in the membrane. The sufficient resistance to heat means highest allowable serviceable temperature of 100° C. or higher, preferably 140° C. or higher.

2. Three-dimensionally Crosslinked Structure (B) Containing a Specific Metal-oxygen Bond The proton-conducting membrane of the present invention contains, as described earlier, the organic material (A), three-dimensionally crosslinked structure (B) containing a specific metal-oxygen bond, agent (C) for imparting proton conductivity, and water (D).

The three-dimensionally crosslinked structure (B) containing a specific metal-oxygen bond for the present invention is responsible for the two major functions, one is to impart high resistance to heat to the proton-conducting membrane, coming from the covalent bond which fast binds the components (A) and (B) to each other, and the other is to hold the agent (C) for imparting proton conductivity, described later.

The three-dimensionally crosslinked structure (B) containing a specific metal-oxygen bond means the structure formed by a metallic oxide, e.g., silicon, titanium or zirconium oxide. Such a structure (B) can be normally prepared easily by the so-called sol-gel process, in which a metallic compound (e.g., metal alkoxide or metal halide) as the precursor having a hydrolyzable, metal-containing group is hydrolyzed and condensed.

The hydrolyzable, metal-containing group is not necessarily present in the precursor, and may be present as the substituent in the organic material (A). When it is present in the organic material (A), the precursor may be substituted by the organic material (A) having the hydrolyzable, metal-containing group.

Of the three-dimensionally crosslinked structures (B) containing a specific metal-oxygen bond, especially preferable is the one having the silicon-oxygen bond. It can be easily prepared by the sol-gel process which uses alkoxy silicates or halogenated silyl group as the stocks. The silicon compound as the stock material is inexpensive and easily controlled for its reactivity, making the process much more economical and processable.

The ratio of the organic material (A) to three-dimensionally crosslinked structures (B) is not limited, but preferably 3:97 to 99:1 by weight, more preferably 10:90 to 97:3. The organic material (A) may not sufficiently impart softness to the membrane at below 3 wt. %, and the three-dimensionally crosslinked structures (B) may not sufficiently impart heat resistance to the membrane at below 1 wt. %.

3. Agent (C) for Imparting Proton Conductivity

The proton-conducting membrane of the present invention contains, as described earlier, the agent (C) for imparting proton conductivity and water (D), in addition to the organic material (A) and three-dimensionally crosslinked structure (B) containing a specific metal-oxygen bond.

The agent (C) for imparting proton conductivity for the present invention is used to increase proton concentration in the proton-conducting membrane. Increased proton concentration is essential for high proton conductivity for the present invention, in consideration of proton conductivity increasing in proportion to proton concentration and concentration of the proton-conducting medium (water (D) in the present invention).

The so-called acid compound which releases protons is used as the agent (C) for imparting proton conductivity. The acid compounds useful as the agent (C) for imparting proton conductivity include phosphoric acid, sulfuric acid, sulfonic acid, carboxylic acid, boric acid, inorganic solid acids, and derivatives thereof Two or more of these acids or derivatives thereof may be used for the present invention.

Of these, inorganic solid acids are more preferable. They are inorganic oxo acids, including those of Keggin structure, e.g., tungstophosphoric acid, tungstosilicic acid, and molybdophosphoric acid, and polyhetero acids of Dawson structure.

These inorganic solid acids have sufficiently large molecular sizes, controlling elution of the acid out of the membrane to a considerable extent, even in the presence of water or the like. Moreover, they have ionic polarity, and are retained in the membrane by the polarity interactions with the metal-oxygen bond and work to control elution of the acid out of the membrane. These are especially desirable properties for the proton-conducting membrane in service at high temperature for extended periods.

Of the inorganic solid acids, tungstophosphoric acid is especially preferable in consideration of its high acidity, large size and magnitude of the polarity interactions with the metal-oxygen bond. The inorganic solid acid may be used together with another acid for the agent (C) for imparting proton conductivity for the present invention. Two or more organic and inorganic acids may be also used for the agent (C).

Content of the agent (C) for imparting proton conductivity is preferably 5 wt. parts or more per 100 wt. parts of the organic compound (A) and three-dimensionally crosslinked structure (B) totaled. At below 5 wt. parts, good proton conductivity of the membrane may not be expected because of insufficient proton concentration. There is no upper content limit for the agent (C) for imparting proton conductivity, and it may be used as much as possible unless membrane properties are not damaged thereby. At above 500 wt. parts per 100 wt. parts of the components (A) and (B) totaled, the membrane is normally excessively hard and fragile when a solid acid is used, and conversely excessively soft when a liquid acid is used. It is therefore adequate to keep the content at 500 wt. parts or less.

4. Water (D)

The proton-conducting membrane of the present invention contains, as described earlier, water (D) in addition to the organic material (A), three-dimensionally crosslinked structure (B) containing a specific metal-oxygen bond, and agent (C) for imparting proton conductivity.

In the present invention, water (D) works as the medium to efficiently conduct the protons. There are several mechanisms by which water conducts protons. For example, water accepts proton to become $H_3O^+$, which moves as it is. In another mechanism, protons hop over the water molecules. Any mechanism is useful for the present invention.

Water is introduced into the membrane, when the fuel cell is in service or tested in a humid atmosphere. Therefore, the membrane may be immersed in water beforehand to introduce water therein. It can be introduced in the membrane, when it is formed in the presence of water or its vapor.

In order to efficiently introduce water in the proton-conducting membrane, it is recommended to impart water retentivity to the membrane. It is therefore desirable that the three-dimensionally crosslinked structure is formed in the presence of water or its vapor to contain water during the manufacturing step, especially during the sol-gel reactions.

The membrane tends to have a higher proton conductivity as its water (D) content increases. However, it is preferable that the content is normally in a range from 1 to 60 wt. %. At below 1 wt. %, the membrane may not have sufficient proton conductivity. The content above 60 wt. % is also undesirable, because the membrane may become excessively porous or swollen. When the membrane for a fuel cell is excessively porous, hydrogen as the fuel may leak onto the cathode (a phenomenon known as chemical short), with the result that energy efficiency is greatly lost. When it is excessively swollen with water, on the other hand, it may undergo volumetric changes which may generate a sufficient stress to damage the electrode or membrane itself. Therefore, the water content is preferably kept at 60 wt. % or below.

The water content can be adjusted by controlling composition of the organic material content of the three-dimensionally crosslinked structure, content of the agent for imparting proton conductivity, or process conditions under which the membrane is formed.

One or more known proton-conducting materials may be used for the present invention, in addition to water (D), to further accelerate proton conductance. These materials include ethylene carbonate, propylene carbonate, butylene carbonate, γ-butylolactone, γ-valerolactone, sulfolane, 3-methylsulfolane, dimethylsulfoxide, dimethylformamide and N-methyloxazolidinone. Content of these proton-conducting materials is not limited, so long as membrane strength is not deteriorated. However, it is normally 50 wt. % or less, based on the whole membrane. Combination of water with one or more proton-conducting materials conducts protons more efficiently than water alone, not only attaining high proton conductivity but also improving compatibility of the agent for imparting proton conductivity with the organic material.

5. Other Optional Components

The proton-conducting membrane of the present invention may contain optional components, in addition to the above-described organic material (A), three-dimensionally crosslinked structure (B), agent (C) for imparting proton conductivity and water (D), so long as the object of the present invention is not damaged. These optional components include reinforcing agent, surfactant, dispersant, reaction promoter, stabilizer, colorant, antioxidant, and inorganic or organic filler.

Taking the reinforcing agent (F) as the example, the proton-conducting membrane of the present invention, although having an adequate strength mainly due to the three-dimensionally crosslinked structure with the metal-oxygen bond, may be fragile depending on its composition, and may be reinforced with fibers.

A variety of materials can be used for the reinforcing fibers or fabrics thereof, including fibers of polymers (e.g., acrylic, polyester, polypropylene and fluorine resins), natural substances (e.g., silk, cotton and paper) and glass. Of these, glass fibers and fabrics thereof are more preferable, viewed from their strength and compatibility with the membrane composition.

Glass fibers may be surface-treated or not. Fiber diameter is not limited, so long as they are uniformly dispersed in the membrane. It is preferably 100 $\mu$m or less, more preferably 20 $\mu$m or less, in consideration of its relation with membrane thickness. Fiber length is not limited. These glass fibers of varying size and fabrics thereof are commercially available (e.g., by Nitto Boseki).

The glass fibers can be easily introduced into the membrane by adding them in the form of powder or yarn to the membrane-forming composition. When a fabric of glass fibers is used, it may be impregnated with the membrane composition and cured by the sol-gel method, or adhered to the membrane prepared beforehand.

The glass fibers themselves may be reinforced with long, crystalline fibers, whiskers or the like.

6. Proton-conducting Membrane and Production Thereof

The proton-conducting membrane of the present invention contains, as described above, the organic material (A), three-dimensionally crosslinked structure (B) containing a specific metal-oxygen bond, agent (C) for imparting proton conductivity, water (D), and one or more optional components (e.g., glass fibers), as required. It is mainly characterized by the organic material (A) and three-dimensionally crosslinked structure (B) being fast bound to each other via the covalent bond.

As described earlier in Description of Prior Art, a mere mixture of an organic material and structure three-dimensionally crosslinked by metal-oxygen bond is known. Such a mixture, however, is insufficient to simultaneously realize softness by the organic material and heat resistance by the three-dimensionally crosslinked structure for the membrane. In the case of the simple mixture, content of the organic material must be increased to some extent in order to secure softness of the membrane. When the organic material present in the membrane at a fairly high content is not proton-conductive, it will cut the proton paths to decrease proton conductivity of the membrane. Even when it is proton-conductive, on the other hand, sufficient improvement of heat resistance may not be expected, and heat resistance higher than that of the conventional fluorine resin membrane is difficult to attain.

The organic material and three-dimensionally crosslinked structure are bound to each other by the covalent bond in the proton-conducting membrane of the present invention, with the result that they are dispersed very finely at the molecular level (nano-dispersion). Therefore, the proton conducting paths will not be disconnected even in the presence of the organic material at a sufficient content needed for securing softness of the membrane. As it is bound to the highly heat-resistant three-dimensionally crosslinked structure, disconnection of its molecules under heat (i.e., thermal decomposition or the like) is controlled. As a result, the proton-conducting membrane has softness and heat resistance simultaneously.

In addition, the organic material is essentially crosslinked, making the membrane stable at high temperature, at which the organic material would be otherwise dissolved or structurally changed.

The proton-conducting membrane of the present invention can be produced by various methods, e.g., one of the following 5 methods:

1) A reaction system of a mixture comprising the organic material, a hydrolyzable inorganic compound which can form the three-dimensionally crosslinked structure and the agent for imparting proton conductivity is prepared and made into a thin film by a known method. The sol-gel reaction is effected in this thin-film reaction system in the presence of water or its vapor.

2) A reaction system of a mixture comprising the organic material, a hydrolyzable inorganic compound which can form the three-dimensionally crosslinked structure and the agent for imparting proton conductivity is prepared and made into a thin film by a known method. The sol-gel reaction is effected in this thin-film reaction system in the presence of water or its vapor, and alcohol having a carbon number of 4 or less or its vapor.

3) A membrane comprising the organic material and structure three-dimensionally crosslinked by a metal-oxygen bond is prepared, and doped with the agent for imparting proton conductivity by immersing the film in a liquid containing the agent.

4) The porous inorganic crosslinked structure is prepared and immersed in a solution of the organic compound for compositing. The composite is then doped with the agent for imparting proton conductivity.

5) A film of the organic compound is prepared, and swollen with a precursor solution for forming the structure three-dimensionally crosslinked by a metal-oxygen bond. The sol-gel reaction is effected in the swollen film and then it is doped with the agent for imparting proton conductivity.

In the methods 1) and 2), the organic material and hydrolyzable inorganic compound which can form the three-dimensionally crosslinked structure may not be necessarily added as the individual stocks, as mentioned earlier. For example, when the organic compound has a hydrolyzable silyl group or hydrolyzable, metal-containing group (e.g., metal alkoxide), the latter hydrolyzable inorganic compound may be omitted.

In the method 5), the organic compound may have a crosslinked structure by a covalent bond, or pseudo-crosslinked structure by, e.g., hydrogen bonding or crystallization. It may be crosslinked during the sol-gel process, or irradiated with electron beam or ultraviolet light for crosslinking after being made into a thin film.

It is the object of the present invention, as described earlier, to provide the proton-conducting membrane containing the organic material (A), three-dimensionally crosslinked structure (B) containing a specific metal-oxygen bond, agent (C) for imparting proton conductivity, water (D), and one or more optional components (e.g., glass fibers), as required. Therefore, the method for producing such a membrane is not limited, so long as the object is satisfied. However, the methods 1) and 2) described above are preferable because of, e.g., their handling simplicity, reliability and investment cost.

The above methods 1) and 2) are described in the order of steps to more concretely explain the method for producing the proton-conducting membrane of the present invention.

The first step is to mix the organic material having a hydrolyzable silyl group with a hydrolyzable inorganic compound, e.g., metal alkoxide which forms, as required, the three-dimensionally crosslinked structure. It is preferable that the hydrolyzable inorganic compound is separately added to no more than 100 wt. % on the organic compound, otherwise the membrane may be excessively hard and the softening effect of the organic compound may not be fully exhibited.

The hydrolyzable inorganic compounds useful for the present invention include alkoxysilicates, e.g., tetraethoxysilane, tetramethoxysilane, tetraisopropoxysilane, tetra-n-butoxysilane, tetra-t-butoxysilane, and their monoalkyl and dialkyl derivatives; phenyltriethoxysilane, halogenated silane, tetraethoxy titanate, tetraisopropoxy titanate, tetra-n-butoxy titanate, tetra-t-butoxy titanate, and their monoalkyl and dialkyl derivatives; alkoxy titanate and its oligomers containing a compound, e.g., acetylacetone, substituted with a group for controlling crosslinking reaction rate; and alkoxy zirconate. When the above hydrolyzable inorganic compound has an alkyl group, the alkyl group may be substituted with a hydrophilic group, e.g., carboxylic, sulfonic, sulfate ester, phosphate, amine salt or hydroxyl group. The hydrophilic group can increase water content in the membrane and also accelerate proton conductance.

In the first step, an adequate solvent may be used as the component (G). The solvents useful for the present invention include alcohols (e.g., methanol, ethanol, isopropanol, n-butanol, and t-butanol), and ethers (e.g., tetrahydrofuran and dioxane). The solvents are not limited to the above, and any one may be used so long as it is useful for dissolution or mixing the organic material, metal alkoxide and the like.

In the first step, a compound having a relative dielectric constant of 20 or more and boiling point of 100° C. or more may be used as the solvent, in addition to the above component (G). A compound having a relative dielectric constant of 20 or more is desirable, because it has an adequate surface active function, and can help disperse the organic material and inorganic compound. On the other hand, a compound having a boiling point of 100° C. or more is desirable, because it remains in the membrane after the heating/curing step, and is substituted with water when it is washed with water, to increase water content in the membrane. Moreover, the residual compound can work as a plasticizer, when a compound having a relatively low molecular weight (e.g., 100 or less) is used as the organic material, to make the membrane softer.

The compounds satisfying the above two properties include ethylene carbonate, propylene carbonate, butylene carbonate, γ-butylolactone, γ-valerolactone, sulfolane, 3-methylsulfolane, dimethylsulfoxide, dimethylformamide and N-methyloxazolidinone.

The second step adds the agent for imparting proton conductivity to the solution obtained by the first step to prepare the precursor solution, i.e., the reaction system containing the stock mixture for forming the membrane. The first and second steps may be integrated for simplifying the production process, by mixing the above stocks simultaneously.

The third step makes a film of the above precursor solution by a known method, e.g., casting or coating. The fourth step is the so-called sol-gel process, in which the above film is treated at an optional temperature in a range from room temperature to 300° C. in the presence of water or its vapor, to produce the target film. The film may be heated in the fourth step by a known method, e.g., heating by an oven or autoclave under elevated pressure.

In the method 1), water or its vapor is introduced into the reaction system, i.e., precursor film, obtained by the third step, for which the precursor is brought into contact with water by heating it in a water vapor atmosphere, or in water after it is cured to an extent that it is not dissolved in water. The hydrolysis and condensation of the precursor film are efficiently effected, when it is heated in the presence of water or its vapor under the above conditions, to produce the membrane of higher resistance to heat. Moreover, the silanol group formed as a result of the hydrolysis improves water retentivity of the membrane, thereby accelerating proton conductance.

The film containing water is condensed and cured more efficiently in the presence of water or its vapor, to increase its water content.

The water vapor atmosphere means the atmosphere having a relative humidity of 10 to 100%. Increasing humidity accelerates the hydrolysis.

In the method 2), the reaction system containing the mixture of the organic material, hydrolyzable inorganic compound which forms the three-dimensionally crosslinked structure and agent for imparting proton conductivity (i.e., the precursor film obtained by the above-described third step) is incorporated with an alcohol or its vapor having a carbon number or 4 or less simultaneously with water or its vapor. In this case, like in the method 1), the precursor film may be heated in a water/alcohol vapor atmosphere, or in a water/alcohol solution after it is cured to an extent that it is not dissolved in the solution. The hydrolysis and condensation of the precursor film are efficiently effected, while it is swollen, when it is heated in the presence of water/alcohol solution or their vapors, to produce the membrane of adequate softness and higher resistance to heat.

The alcohol compounds useful for the method 2) are those having a carbon number of 4 or less, including methanol, ethanol, isopropanol, n-propanol, n-butanol, t-butanol, ethylene glycol, propylene glycol and glycerin. The preferable alcohol/water ratio is 1/99 to 90/10.

The water/alcohol mixed vapor atmosphere means the atmosphere having a relative humidity of 10 to 100%. Increasing humidity is desirable, because the membrane is swollen more adequately and hydrolyzed more efficiently as relative humidity approaches 100%.

The temperature level for the fourth step is not limited, so long as the three-dimensionally crosslinked structure can be formed by the sol-gel reaction and the organic material is not decomposed at that temperature level. Thickness of the membrane is not limited, but normally in a range from $10 \mu m$ to 1 mm.

The reaction system may be incorporated with a catalyst, e.g., hydrochloric, sulfuric or phosphoric acid, beforehand in order to accelerate formation of the three-dimensionally crosslinked structure. Formation of the three-dimensionally crosslinked structure can be also accelerated in the presence of an alkali, and hence use of a basic catalyst, e.g., ammonia, may be used. However, an acidic catalyst is more preferable, because a basic catalyst may probably react with the agent for imparting proton conductivity.

The proton-conductive membrane thus produced is an innovative organic/inorganic composite membrane having unprecedentedly high heat resistance and durability, and high proton conductivity even at elevated temperature, and can be suitably used as the membrane for fuel cells. When the proton-conductive membrane of the present invention is used for fuel cells, the so-called membrane/electrode assembly with the membrane joined to the catalyst-carrying electrode is formed. The method for producing the membrane/electrode assembly is not limited: it may be produced by an adequate method, e.g., hot pressing or coating the membrane or electrode with a proton-conductive composition.

The proton-conductive membrane of the present invention is applicable not only to PRFCs but also to, e.g., chemical sensors and ion-exchanging membranes.

EXAMPLES

The present invention is described more concretely by EXAMPLES, which by no means limit the present invention. All of the compounds and solvents used in EXAMPLES and COMPARATIVE EXAMPLES were commercial ones. They were used directly, i.e., not treated for these examples.

Analytical Methods (1) Determination of Water Content in the Membrane

The section of the proton-conductive membrane was measured by a thermogravimetric analyzer (Seiko Instruments, TG/DTA320). The membrane generally shows a weight loss at 90 to 130° C., considered to result from evaporation of water, because such a phenomenon was not observed with the completely water-free membrane. Therefore, water content of the membrane in this specification means the weight loss divided by the whole membrane weight.

Evaluation Methods (1) Evaluation of Heat Resistance

The proton-conductive membrane was heated at 140° C. for 24 hours in an oven in a nitrogen atmosphere. The treated membrane was evaluated for its heat resistance by visual and bending functional tests, and rated by:

○: soft membrane, not bent when folded

×: easily broken, or decomposed or molten, when folded (2) Evaluation of Proton Conductivity The proton-conductive membrane of the present invention was coated with silver paste on both sides, which was dried to form the electrodes, to produce the membrane/electrode assembly (MEA). It was tested for 4-terminal impedance by an electrochemical impedance meter (Solartron, model 1260) in a frequency range from 0.1 Hz to 2 MHz, to determine its proton conductivity.

In the above analysis, the MEA sample was supported in an electrically insulated closed container, and measured for its proton conductivity at varying temperature in a water vapor atmosphere, where cell temperature was increased from room temperature to 160° C. by a temperature controller. The value measured at 140° C. is reported in this specification as the representative one. The measurement tank was pressurized to 5 atms. for the determination of proton conductivity at 140° C.

EXAMPLE 1

Synthesis of Polytetrametihylene Oxide wiith Triethoxysilyl Group at the Terminals 75.0 g (115.4 mmols) of polytetramethiylenie glycol #650 (Wako Pure Chemical Industries, weight-average molecular weight: 650) was put in a dried glass container, to which 57.1 g (230.8 mmols) of 3-triethoxysilylpropyl isocyaniate (Shini-Etsu Silicone, KBE-9007) was added, and the mixture was slowly agitated at 60° C. for 120 hours in a nitrogen atmosphere, for the following reaction. The viscous liquid obtained was tested by $H^1$-NMR (BRTJKER Japan, DRX-300), and the spectral pattern, reasonably considered to be relevant to a polytetramethylene oxide with triethoxysilyl groups at the terminals, was observed. The product was considered to be almost pure, as no impurity signal was observed within the detectable sensitivity of NMR. The compound thus produced had the silicon atoms derived from the hydrolyzable silyl group (triethoxysilyl group) at 4.9 wt. %, based on the total composition.

$$HO(CH_2CH_2CH_2CH_2O)_nH+2OCNCH_2CH_2CH_2Si(OC_2H_5)_3 \rightarrow$$
$$(OC_2H_5)_3SiCH_2CH_2CH_2NHCOO(CH_2CH_2CH_2CH_2O)_nCON$$
$$HCH_2CH_2CH_2Si(OC_2H_5)_3$$

The same procedure as that used for EXAMPLE 1 was repeated, except that polytetramethylene glycol #650 was replaced by polytetramethylene glycol #1000 (Wako Pure Chemical Industries, weight-average molecular weight: 1000) or polyethylene glycol #600 (Wako Pure Chemical Industries, weight-average molecular weight: 600), to prepare the compounds with the hydrolyzable silyl group at the terminals.

Preparation of Mixed Solution and Film-making 1.0 g of the polytetramethylene oxide with triethoxysilyl group at the terminals was dissolved in 1.0 g of isopropanol. 1.0 g of tungustophosphoric acid (Wako Pure Chemical Industries) was separately dissolved in 1.0 g of isopropanol. These solutions were mixed with each other for 1 min with vigorous agitation, and the mixed solution was put in a polystyrene petri dish (Yamamoto MFG), 9 cm of inner diameter. This dish was put in a container kept at 60° C., to which water vapor generated at 70° C. was introduced to heat the content for 12 hours. This produced a colorless, transparent, soft membrane.

EXAMPLE 2

The same procedure as that used for EXAMPLE 1 was repeated, except that 0.5 g of tungstophosphoric acid was used, to prepare a membrane.

EXAMPLE 3

The same procedure as that used for EXAMPLE 1 was repeated, except that polytetramethylene glycol #650 was replaced by polytetramethylene glycol #250 (Aldrich), 1.17 g of tungstophosphoric acid was used, and water vapor was not introduced for heating, to prepare a membrane.

EXAMPLE 4

The same procedure as that used for EXAMPLE 1 was repeated, except that 0.5 g of tungstophosphoric acid was used, 0.5 g of ethylene carbonate (Wako Pure Chemical Industries) was added and water vapor was not introduced for heating, to prepare a membrane.

EXAMPLE 5

The same procedure as that used for EXAMPLE 1 was repeated, except that 0.75 g of tungstophosphoric acid was used, 0.5 g of ethylene carbonate was added and water vapor was not introduced for heating, to prepare a membrane.

EXAMPLE 6

The same procedure as that used for EXAMPLE 2 was repeated, except that 0.5 g of ethylene carbonate was added, to prepare a membrane.

EXAMPLE 7

0.67 g of the polytetramethylene oxide with triethoxysilyl group at the terminals, which was prepared in a manner similar to that for EXAMPLE 1, and 0.33 g of phenyltriethoxysilane (Toshiba Silicone) were dissolved in 1.0 g of isopropanol. 0.57 g of tungustophosphoric acid and 0.28 g propylene carbonate (Wako Pure Chemical Industries) were separately dissolved in 1.0 g of isopropanol. These solutions were mixed with each other for 1 min with vigorous agitation, and the mixed solution was put in a polystyrene petri dish, 9 cm of inner diameter. This dish was heated at 60° C. for 12 hours in an oven. This produced a colorless, transparent, soft membrane.

EXAMPLE 8

The same procedure as that used for EXAMPLE 1 was repeated, except that water vapor generated at 70° C. was replaced by a 90/10 mixture of water vapor generated at 80° C. and n-butanol vapor, to prepare a membrane.

EXAMPLE 9

The same procedure as that used for EXAMPLE 1 was repeated, except that 0.1 g of glass fibers (Nitto Boseki, PF70E-001, fiber major axis: 70 μm, fiber diameter: 10 μm) were added to the membrane composition, to prepare a membrane.

The membrane thus prepared was as proton-conductive as that prepared by EXAMPLE 1, and had a very high strength.

EXAMPLE 10

The same procedure as that used for EXAMPLE 1 was repeated, except that polytetramethylene glycol #650 was replaced by polytetramethylene glycol #1000 (Wako Pure Chemical Industries), to prepare a membrane.

This membrane was coated with polytetramethylene glycol #1000 by a bar coater to a thickness of 3 μm, and then coated with a gas diffusion type electrode (E-TEK, platinum content: 0.30 mg/cm$^2$, diameter: 20 mm) on both sides. This membrane was assembled in a test cell, to evaluate fuel cell output performance, where hydrogen and oxygen flown at 60 ml/min were reacted with each other at 100° C. as cell temperature for both and 3 atms. as gas pressure. Hydrogen was passed through a water bubbler beforehand to be humidified.

Cell output performance was tested by an electrochemical impedance meter (Solartron, model 1260). The results are given in FIG. 1.

Comparative Example 1

Du Pont's Nafion117 was directly used.

Comparative Example 2

The same procedure as that used for EXAMPLE 7 was repeated, except that polytetramethylene glycol #650 was replaced by polytetramethylene glycol #600 (Wako Pure Chemical Industries), and 0.5 g of propylene carbonate and 0.5 g of tungstophosphoric acid were used during the film-making step, to prepare a membrane.

COMPARATIVE EXAMPLE 2 used the organic material mainly characterized by a chain of 2 carbon atoms.

Comparative Example 3

The same procedure as that used for EXAMPLE 1 was repeated, except that 0.25 g of tungstophosphoric acid was used, to prepare a membrane. The membrane thus prepared was heated at 140° C. for 3 hours in a dry nitrogen atmosphere, to remove moisture from the membrane. It was measured for its proton conductivity, while it was not humidified.

It showed no weight loss in the thermogravimetric analysis (Seiko Instruments, TG/DTA320) up to 200° C., indicating that the membrane contained essentially no moisture.

Comparative Example 4

The same procedure as that used for EXAMPLE 1 was repeated, except that tungstophosphoric acid as the agent for imparting proton conductivity was replaced by 0.5 g of 1N hydrochloric acid as a curing catalyst, to prepare a membrane. The hydrochloric acid completely evaporated during the heat treatment for curing, and no residual acid was observed.

Example 11

Synthesis of Dodecanediol with Triethoxysilyl Group at the Terminals

The same procedure as that used for EXAMPLE 1 was repeated, except that polytetramethylene glycol #650 was replaced by 20.2 g (100 mmol) of 1, 12-dodecanediol (Nacalai tesque), and 49.5 g (200 mmols) of 3-triethoxysilylpropyl isocyanate (the quantity was the same as that of the hydroxyl group) was used, to quantitatively prepare the subject compound. Its chemical structure was determined by the NMR analysis.

The compound thus prepared is an olefinic organic material having no ether bond, unlike the one prepared using polytetramethylene glycol.

In addition to dodecanediol, other diols (e.g., decanediol, octanediol, hexanediol and butanediol) were used, to confirm that they can give the compounds with the triethoxysilyl group at the terminals. The same is confirmed with dodecanediamine and hexanediamine. When the amine was used, the triethoxysilyl group was bound not via the urethane bond but via the urea bond.

Preparation of Mixed Solution and Film-making

The same procedure as that used for EXAMPLE 2 was repeated, except that the polytetramethylene oxide with triethoxysilyl group at the terminals was replaced by 1.0 g of the above dodecanediol with triethoxysilyl group at the terminals, to prepare a membrane. The membrane thus prepared was colorless, transparent, and harder than that prepared by EXAMPLE 1.

EXAMPLE 12

Preparation of Mixed Solution and Film-making

The same procedure as that used for EXAMPLE 2 was repeated, except that the polytetramethylene oxide with triethoxysilyl group at the terminals was replaced by commercial bis(triethoxysilyl)octane (AZmax), to prepare a membrane. The membrane thus prepared was colorless, transparent, and harder than that prepared by EXAMPLE 2.

Bis(triethoxysilyl)octane has no ether or urethane bond, with the olefin body of methylene chain having 8 carbon atoms between the terminal triethoxysilyl groups.

EXAMPLE 13

The same procedure as that used for EXAMPLE 12 was repeated, except that 0.78 g of tungstophosphoric acid was used, to prepare a membrane. The membrane thus prepared was relatively hard, like the one prepared by EXAMPLE 12.

EXAMPLE 14

The same procedure as that used for EXAMPLE 12 was repeated, except that the bis(triethoxysilyl)octane was replaced by bis(triethoxysilyl)hexane (AZmax), and 1.04 g of tungstophosphoric acid was used, to prepare a membrane. The membrane thus prepared was relatively hard, like the one prepared by EXAMPLE 12.

EXAMPLE 15

Preparation of Mixed Solution and Film-making

The same procedure as that used for EXAMPLE 2 was repeated, except that tungstophosphoric acid was replaced by molybdophosphoric acid (Wako Pure Chemical Industries), to prepare a membrane. The membrane thus prepared was yellowish transparent, and as soft as the one prepared by EXAMPLE 2.

Comparative Example 5

The same procedure as that used for EXAMPLE 2 was repeated, except that polytetramethylene oxide with triethoxysilyl group at the terminals was replaced by polyethylene oxide with triethoxysilyl group at the terminals (average molecular weight: 600), to prepare a membrane. The membrane thus prepared was as soft as the one prepared by EXAMPLE 2.

EXAMPLE 16

0.30 g of the polytetramethylene glycol #650 with the hydrolyzable silyl group at the terminals and 0.70 g of the polyethylene glycol #600 with the hydrolyzable silyl group at the terminals, both prepared by EXAMPLE 1, were dissolved in 1.0 g of isopropanol. 0.25 g of tugstophosphoric acid (Wako Pure Chemical Industries) and 0.25 g of ethylene carbonate were separately dissolved in 1.0 g of isopropanol. These solutions were mixed with each other for 1 min with vigorous agitation, and the mixed solution was put in a polystyrene petri dish, 9 cm of inner diameter. This dish was heated at 60° C. for 12 hours in a saturated water vapor atmosphere. This produced a 100 μm thick membrane.

EXAMPLE 17

The same procedure as that used for EXAMPLE 16 was repeated, except that 0.30 g of the polytetramethylene glycol #1000 with the hydrolyzable silyl group at the terminals and 0.70 g of the polyethylene glycol #600 with the hydrolyzable silyl group at the terminals, both prepared by EXAMPLE 1, were dissolved in 1.0 g of isopropanol, to prepare a membrane.

EXAMPLE 18

The same procedure as that used for EXAMPLE 16 was repeated, except that 0.50 g of the polytetrametyhylene glycol #1000 with the hydrolyzable silyl group at the terminals and 0.50 g of the polyetyhylene glycol #600 with the hydrolyzable silyl group at the terminals, both prepared by EXAMPLE 1, were dissolved in 1.0 g of isopropanol, to prepare a membrane.

EXAMPLE 19

The same procedure as that used for EXAMPLE 16 was repeated, except that 0.70 g of the polytetrametyhylene glycol #1000 with the hydrolyzable silyl group at the terminals and 0.30 g of the polyetyhylene glycol #600 with the hydrolyzable silyl group at the terminals, both prepared by EXAMPLE 1, were dissolved in 1.0 g of isopropanol, to prepare a membrane.

EXAMPLE 20

The same procedure as that used for EXAMPLE 2 was repeated, except that 0.1 g of tetraisopropoxy titanate (Wako Pure Chemical Industries) was used as the precursor for the three-dimensionally crosslinked structure, to prepare a membrane. The membrane thus prepared had almost the same properties as the one prepared by EXAMPLE 2.

Tables 1 to 3 summarize the compositions used for EXAMPLES, heating conditions and properties of the membranes prepared by these examples. Table 4 summarizes those for COMPARATIVE EXAMPLES.

It is apparent, as shown in Tables 1 to 4, that each of the proton-conducting membranes of the present invention (prepared by EXAMPLES 1 to 20), comprising an organic material (A), three-dimensionally crosslinked structure (B) containing a specific metal-oxygen bond, agent (C) for imparting proton conductivity, and water (D), with the components (A) and (B) being bound to each other via a covalent bond, shows high resistance to heat and proton conductivity at 140° C. By contrast, the fluorine-based resin (COMPARATIVE EXAMPLE 1), which is used as one of the representative electrolytic membranes, shows deteriorated properties. Each of those failing to satisfy the requirements of the present invention with respect to the components (A) to (D) (prepared by COMPARATIVE EXAMPLES 2 to 5) is clearly inferior to the present invention as the electrolytic membrane in proton conductivity, resistance to heat or mechanical properties. It is found, when the organic material is incorporated with a water-retentive resin having 4 carbon atoms connected in series in the main chain (EXAMPLES 16 to 19), that the membrane has improved resistance to heat and increased water content to enhance proton conductivity.

It is also found, when the results of EXAMPLE 1 are compared with those of EXAMPLE 3, that use of water vapor for curing in the production process increases efficiency of the sol-gel reaction and also increases water content in the membrane, leading to enhanced proton conductivity. Power generation of the fuel cell, which uses the proton-conducting membrane of the present invention, is also confirmed (EXAMPLE 10).

The membrane has sufficient resistance to heat by compositing an organic material with inorganic crosslinked structure. It makes a good proton-conducting membrane showing high proton conductivity at high temperature, when incorporated with an agent for imparting proton conductivity and water.

The proton-conducting membrane of the present invention can increase working temperature of PEFCs, now attracting much attention, to 100° C. or higher, leading to improved power generation efficiency and reduced CO poisoning. Increased working temperature will make the PEFC applicable to cogeneration systems utilizing the waste heat, leading to drastic increase in energy efficiency.

TABLE 1

| Items | Covalent-bonded organic material (A) and precursor for the three-dimensionally crosslinked structure (B) | Separately added precursor for the three-dimensionally crosslinked structure (B) | Agent (C) for imparting proton conductivity | Proton-conducting material (E) | Heating conditions | Content of water (D) in the membrane | Results of the heat resistance test, conducted at 140° C. | Proton conductivity at 140° C. |
|---|---|---|---|---|---|---|---|---|
| EXAMPLE 1 | Polytetramethyleneoxide with triethoxysilyl group at both terminals (100 wt. parts) | — | Tungstophosphoric acid (100 wt. parts) | — | 60° C., steam, 100% RH, 12 hours | 28 wt. % | ○ | $8.7 \times 10^{-3}$ S/cm |
| EXAMPLE 2 | Polytetramethyleneoxide with triethoxysilyl group at both terminals (100 wt. parts) | — | Tungstophosphoric acid (50 wt. parts) | — | 60° C., steam, 100% RH, 12 hours | 30 wt. % | ○ | $7.1 \times 10^{-3}$ S/cm |
| EXAMPLE 3 | Polytetramethyleneoxide with triethoxysilyl group at both terminals (100 wt. parts) | — | Tunstophosphoric acid (117 wt. parts) | — | 60° C., (no water vapor) 12 hours | 13 wt. % | ○ | $2.1 \times 10^{-4}$ S/cm |
| EXAMPLE 4 | Polytetramethyleneoxide with triethoxysilyl group at both terminals (100 wt. parts) | — | Tungstophosphoric acid (50 wt. parts) | Ethylene carbonate (50 wt. parts) | 60° C., (no water vapor) 12 hours | 8 wt. % | ○ | $5.6 \times 10^{-3}$ S/cm |
| EXAMPLE 5 | Polytetramethyleneoxide with triethoxysilyl group at both terminals (100 wt. parts) | — | Tungstophosphoric acid (75 wt. parts) | Ethylene carbonate (50 wt. parts) | 60° C., (no water vapor) 12 hours | 10 wt. % | ○ | $3.7 \times 10^{-3}$ S/cm |
| EXAMPLE 6 | Polytetramethyleneoxide with triethoxysilyl group at both terminals (100 wt. parts) | — | Tungstophosphoric acid (50 wt. parts) | Ethylene carbonate (50 wt. parts) | 60° C., steam, 100% RH, 12 hours | 26 wt. % | ○ | $7.1 \times 10^{-3}$ S/cm |
| EXAMPLE 7 | Polytetramethyleneoxide with triethoxysilyl group at both terminals (100 wt. parts) | Phenyltriethoxysilane (33 wt. parts) | Tungstophosphoric acid (57 wt. parts) | Propylene carbonate (28 wt. parts) | 60° C., (no water vapor) 12 hours | 14 wt. % | ○ | $9.7 \times 10^{-4}$ S/cm |
| EXAMPLE 8 | Polytetramethyleneoxide with triethoxysilyl group at both terminals (100 wt. parts) | — | Tungstophosphoric acid (100 wt. parts) | — | 60° C., mixed vapor of water and n-butanol, vapor concentration: 100%, 12 hours | 18 wt. % | ○ | $3.2 \times 10^{-3}$ S/cm |
| EXAMPLE 9 | Polytetramethyleneoxide with triethoxysilyl group at both terminals (100 wt. parts) | — | Tungstophosphoric acid (100 wt. parts) | — | 60° C., steam, 100% RH, 12 hours | 6 wt. % | ○ | $1.3 \times 10^{-3}$ S/cm |

TABLE 2

| Items | Covalent-bonded organic material (A) and precursor for the three-dimensionally crosslinked structure (B) | Separately added precursor for the three-dimensionally crosslinked structure (B) | Agent (C) for imparting proton conductivity | Proton-conducting material (E) | Heating conditions | Content of water (D) in the membrane | Results of the heat resistance test, conducted at 140° C. | Proton conductivity at 140° C. |
|---|---|---|---|---|---|---|---|---|
| EXAMPLE 10 | Polytetramethyleneoxide with triethoxysilyl group at both terminals (100 wt. parts) | — | Tungstophosphoric acid (100 wt. parts) | — | 60° C., steam, 100% RH, 12 hours | 41 wt. % | ○ | $9.7 \times 10^{-3}$ S/cm |
| EXAMPLE 11 | Dodecanediol with triethoxysilyl group at both terminals (100 wt. parts) | — | Tungstophosphoric acid (50 wt. parts) | — | 60° C., steam, 100% RH, 12 hours | 6 wt. % | ○ | $1.5 \times 10^{-4}$ S/cm |
| EXAMPLE 12 | Bis(triethoxysilyl) octane (100 wt. parts) | — | Tungstophosphoric acid (50 wt. parts) | — | 60° C., steam, 100% RH, 12 hours | 15 wt. % | ○ | $3.6 \times 10^{-3}$ S/cm |
| EXAMPLE 13 | Bis(triethoxysilyl) octane (100 wt. parts) | — | Tungstophosphoric acid (78 wt. parts) | — | 60° C., steam, 100% RH, 12 hours | 15 wt. % | ○ | $1.8 \times 10^{-2}$ S/cm |
| EXAMPLE 14 | Bis(triethoxysilyl) hexane (100 wt. parts) | — | Tungstophosphoric acid (104 wt. parts) | — | 60° C., steam, 100% RH, 12 hours | 59 wt. % | ○ | $9.8 \times 10^{-3}$ S/cm |

TABLE 2-continued

| Items | Covalent-bonded organic material (A) and precursor for the three-dimensionally crosslinked structure (B) | Separately added precursor for the three-dimensionally crosslinked structure (B) | Agent (C) for imparting proton conductivity | Proton-conducting material (E) | Heating conditions | Content of water (D) in the membrane | Results of the heat resistance test, conducted at 140° C. | Proton conductivity at 140° C. |
|---|---|---|---|---|---|---|---|---|
| EXAMPLE 15 | Polytetramethyleneoxide with triethoxysilyl group at both terminals (100 wt. parts) | — | Molybdophosphoric acid (50 wt. parts) | — | 60° C., steam, 100% RH, 12 hours | 24 wt. % | ○ | $2.3 \times 10^{-3}$ S/cm |

TABLE 3

| Items | Covalent-bonded organic material (A) and precursor for the three-dimensionally crosslinked structure (B) | Separately added precursor for the three-dimensionally crosslinked structure (B) | Agent (C) for imparting proton conductivity | Proton-conducting material (E) | Heating conditions | Content of water (D) in the membrane | Results of the heat resistance test, conducted at 140° C. | Proton conductivity at 140° C. |
|---|---|---|---|---|---|---|---|---|
| EXAMPLE 16 | Polytetramethyleneoxide with triethoxysilyl group at both terminals (30 wt. parts), Polyethylene oxide with triethoxysilyl group at both terminals (70 wt. parts) | — | Tungstophosphoric acid (25 wt. parts) | — | 60° C., steam, 100% RH, 12 hours | 42 wt. % | ○ | $1.0 \times 10^{-2}$ S/cm |
| EXAMPLE 17 | Polytetramethyleneoxide with triethoxysilyl group at both terminals (30 wt. parts), Polyethylene oxide with triethoxysilyl group at both terminals (70 wt. parts) | — | Tungstophosphoric acid (25 wt. parts) | — | 60° C., steam, 100% RH, 12 hours | 45 wt. % | ○ | $1.2 \times 10^{-2}$ S/cm |
| EXAMPLE 18 | Polytetramethyleneoxide with triethoxysilyl group at both terminals (50 wt. parts), Polyethylene oxide with triethoxysilyl group at both terminals (50 wt. parts) | — | Tungstophosphoric acid (25 wt. parts) | — | 60° C., steam, 100% RH, 12 hours | 38 wt. % | ○ | $1.2 \times 10^{-2}$ S/cm |
| EXAMPLE 19 | Polytetramethyleneoxide with triethoxysilyl group at both terminals (70 wt. parts), Polyethylene oxide with triethoxysilyl group at both terminals (30 wt. parts) | — | Tungstophosphoric acid (25 wt. parts) | — | 60° C., steam, 100% RH, 12 hours | 32 wt. % | ○ | $1.0 \times 10^{-2}$ S/cm |
| EXAMPLE 20 | Polytetramethyleneoxide with triethoxysilyl group at both terminals (100 wt. parts) | Tetraisopropoxy-Titanate (10 wt. parts) | Tungstophosphoric acid (50 wt. parts) | — | 60° C., steam, 100% RH, 12 hours | 26 wt. % | ○ | $3.3 \times 10^{-3}$ S/cm |

TABLE 4

| Items | Covalent-bonded organic material (A) and precursor for the three-dimensionally crosslinked structure (B) | Separately added precursor for the three-dimensionally crosslinked structure (B) | Agent (C) for imparting proton conductivity | Proton-conducting material (E) | Heating conditions | Content of water (D) in the membrane | Results of the heat resistance test, conducted at 140° C. | Proton conductivity at 140° C. |
|---|---|---|---|---|---|---|---|---|
| COMPARATIVE EXAMPLE 1 | | Nafion117 (Du Pont) | | — | — | — | × (Breaking) | Immeasurable, because the membrane was deteriorated in properties and broken |

TABLE 4-continued

| Items | Covalent-bonded organic material (A) and precursor for the three-dimensionally crosslinked structure (B) | Separately added precursor for the three-dimensionally crosslinked structure (B) | Agent (C) for imparting proton conductivity | Proton-conducting material (E) | Heating conditions | Content of water (D) in the membrane | Results of the heat resistance test, conducted at 140° C. | Proton conductivity at 140° C. |
|---|---|---|---|---|---|---|---|---|
| COMPARATIVE EXAMPLE 2 | Polyethylene oxide with triethoxysilyl group at both terminals (67 wt. parts) | Phenyltriethoxy-Silane (10 wt. parts) | Tungstophosphoric acid (50 wt. parts) | Propylene carbonate (50 wt. parts) | 60° C., (no water vapor) 12 hours | 40 wt. % | × (Dissolution) | Immeasurable, because the membrane was dissolved |
| COMPARATIVE EXAMPLE 3 | Polytetramethyleneoxide with triethoxysilyl group at both terminals (100 wt. parts) | — | Tungstophosphoric acid (25 wt. parts) | — | 60° C., steam, 100% RH, 12 hours | 0 wt. % (After the membrane was drying-treated) | ○ | $8.9^{-8}$ S/cm |
| COMPARATIVE EXAMPLE 4 | Polytetramethyleneoxide with triethoxysilyl group at both terminals (100 wt. parts) | — | — (Hydrochloric acid added as a curing catalyst) | — | 60° C., steam, 100% RH, 12 hours | 37 wt. % | ○ | Lower than measurement limit |
| COMPARATIVE EXAMPLE 5 | Polytetramethyleneoxide with triethoxysilyl group at both terminals (100 wt. parts) | — | Tungstophosphoric acid (50 wt. parts) | — | 60° C., steam, 100% RH, 12 hours | 62 wt. % | × (Dissolution) | Immeasurable, because the membrane was dissolved |

What is claimed is:

1. A proton-conducting membrane, comprising:
    (A) an organic material having a main chain, which comprises a polytetramethylene oxide or a polymethylene;
    (B) a three-dimensionally crosslinked structure containing a specific metal-oxygen bond;
    (C) an agent for imparting proton conductivity; and
    (D) water, wherein:
        (i) said organic material (A) has a number-average molecular weight of 56 to 30,000, and at least 4 carbon atoms connected in series in the main chain; and
        (ii) said organic material (A) and three-dimensionally crosslinked structure (B) are bound to each other via a covalent bond.

2. The proton-conducting membrane according to claim 1, wherein said organic material (A) is octamethylene.

3. The proton-conducting membrane according to claim 1, wherein said organic material (A) contains a water-retentive resin (E) having a chain and having less than 4 carbon atoms connected in series in the chain.

4. The proton-conducting membrane according to claim 3, wherein said water-retentive resin (E) is a polyethylene oxide.

5. The proton-conducting membrane according to claim 1, wherein said three-dimensionally crosslinked structure (B) is formed by a silicon-oxygen bond.

6. The proton-conducting membrane according to claim 1, wherein said agent (C) for imparting proton conductivity is an inorganic solid acid.

7. The proton-conducting membrane according to claim 6, wherein said inorganic solid acid is tungstophosphoric acid.

8. The proton-conducting membrane according to claim 1, which contains 5 to 500 wt. parts of said agent (C) for imparting proton conductivity per 100 wt. parts of said organic material (A) and three-dimensionally crosslinked structure (B) totaled.

9. The proton-conducting membrane according to claim 1, which contains water (D) at 1 to 60 wt. % of the proton-conducting membrane.

10. The proton-conducting membrane according to claim 1, which further contains a reinforcing agent (F).

11. The proton-conducting membrane according to claim 10, wherein said reinforcing agent (F) is glass fibers.

12. A fuel cell comprising a proton-conducting membrane, said membrane comprising:
    (A) an organic material having a main chain, which comprises a polytetramethylene oxide or a polymethylene;
    (B) a three-dimensionally crosslinked structure containing a specific metal-oxygen bond;
    (C) an agent for imparting proton conductivity; and
    (D) water, wherein:
        (i) said organic material (A) has a number-average molecular weight of 56 to 30,000, and at least 4 carbon atoms connected in series in the main chain; and
        (ii) said organic material (A) and three-dimensionally crosslinked structure (B) are bound to each other via a covalent bond.

13. The fuel cell according to claim 12, wherein said organic material (A) is octamethylene.

14. The fuel cell according to claim 12, wherein said organic material (A) contains a water-retentive resin (E) having a chain and having less than 4 carbon atoms connected in series in the chain.

15. The fuel cell according to claim 14, wherein said water-retentive resin (E) is a polyethylene oxide.

16. The fuel cell according to claim 12, wherein said three-dimensionally crosslinked structure (B) is formed by a silicon-oxygen bond.

17. The fuel cell according to claim 12, wherein said agent (C) for imparting proton conductivity is an inorganic solid acid.

18. The fuel cell according to claim 17, wherein said inorganic solid acid is tungstophosphoric acid.

19. The fuel cell according to claim 18, which contains 5 to 500 wt. parts of said agent (C) for imparting proton conductivity per 100 wt. parts of said organic material (A) and three dimensionally crosslinked structure (B) totaled.

20. The fuel cell according to claim 12, which contains water (D) at 1 to 60 wt. % of proton-conducting membrane.

21. The fuel cell according claim 12, which further contains a reinforcing agent (F).

22. The fuel cell according to claim 21, wherein said reinforcing agent (F) is glass fibers.

\* \* \* \* \*